D. T. NICHOLSON.
MEANS FOR INDICATING THE THICKNESS OF CAKE FORMATION IN FILTER PRESSES.
APPLICATION FILED MAR. 2, 1918.
1,299,996.
Patented Apr. 8, 1919.
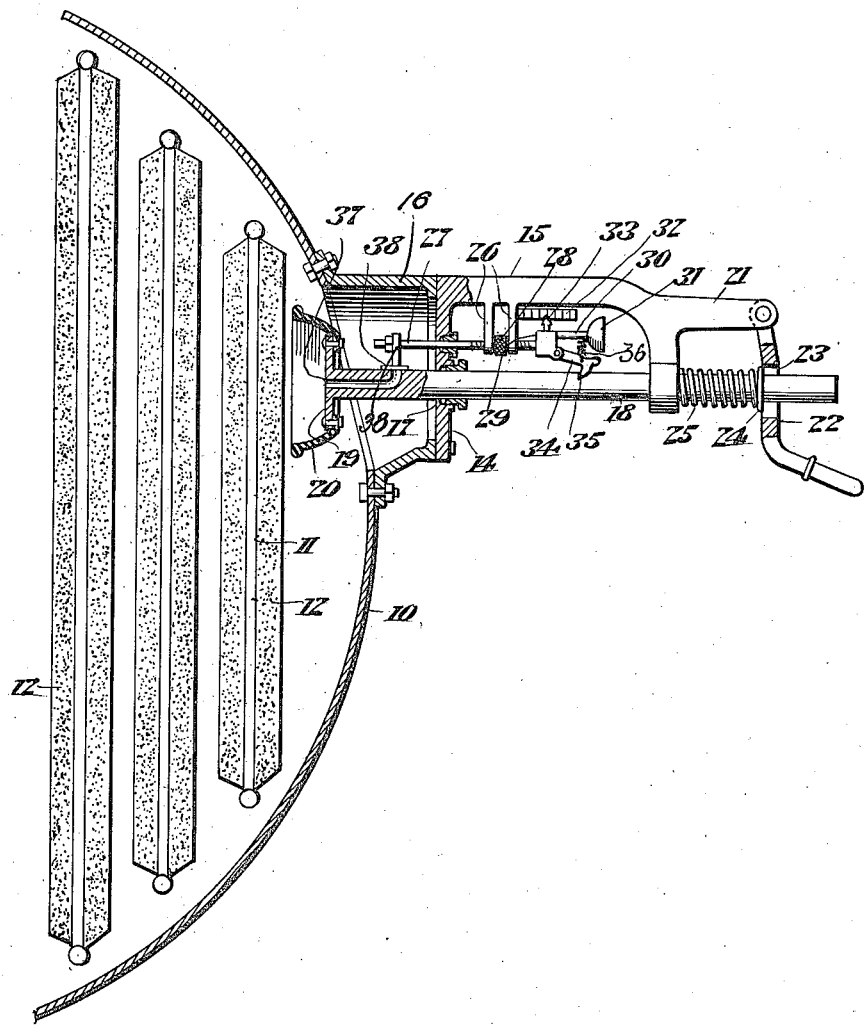
Witness
Inventor
D. T. Nicholson
By Victor J. Evans
Attorney

UNITED STATES PATENT OFFICE.

DANIEL T. NICHOLSON, OF VISALIA, CALIFORNIA.

MEANS FOR INDICATING THE THICKNESS OF CAKE FORMATION IN FILTER-PRESSES.

1,299,996.　　　　　　Specification of Letters Patent.　　Patented Apr. 8, 1919.

Application filed March 2, 1918. Serial No. 220,108.

*To all whom it may concern:*

Be it known that I, DANIEL T. NICHOLSON, a citizen of the United States, residing at Visalia, in the county of Tulare and State of California, have invented new and useful Improvements in Means for Indicating the Thickness of Cake Formation in Filter-Presses, of which the following is a specification.

This invention comprehends the provision of a contrivance for indicating the thickness of cake formation in filter presses of the type utilized for separating the solid matter from liquids.

In presses of the above mentioned character, the liquid to be filtered is introduced into the press proper, wherein is arranged a plurality of filtering devices. As the filtration takes place, the solid or semi-solid matter which will not pass through the filtering devices clings to the latter in "cake" formation, and the thickness of these cakes gradually increases as the filtering process continues.

In accordance with the present invention a means is devised by which the operator of one or more of such presses is notified of the fact that the cakes within the press have increased in thickness to the desired size and are ready to be discharged from the press.

In carrying out my invention I provide a means susceptible of adjustment for cakes of various thicknesses, so that upon the formation of a cake of a predetermined thickness, a signal is sounded to command the attention of the operator, thus informing him that it is time to remove the cakes from the press.

Before entering into a detail description of what is herein disclosed, I desire to have it understood that the drawing is merely illustrative of one embodiment of the invention which is not to be considered restrictive, inasmuch as such changes in the construction and arrangement of parts may be resorted to when desired as fall within the scope of what is claimed, and that furthermore a general application of the invention to various types of presses is contemplated by the claims.

In the drawings forming part of this specification the preferred embodiment of the invention is illustrated, and wherein:—

The figure shows a vertical sectional view of the contrivance associated with a fragmentary portion of a pressure filter.

In the drawings, 10 indicates the body or shell of the press in which is arranged a series of uniformly spaced filtering devices 11 to the sides of which cling the solid or semi-solid matter in cake-like formation indicated at 12, which fails to pass through the filtering devices as the filtration process of the liquid continues. It might here be stated that this design of press is merely shown for illustrative purposes, and does not constitute a part of the invention.

In the preferred embodiment of the present invention I make use of a bracket including a base 14 from one side of which projects a curved arm 15 with the free extremity of the latter overlying the base as shown. The base 14 is secured in any suitable manner to the outer end of a casing 16, the latter being secured to the body or shell 10 of the press, surrounding an opening therein whereby communication is established between the press and casing 16. The base 14 is provided with an opening 17 which is disposed in alinement with a similar opening in the curved extremity of the arm 15, and arranged to slide through said openings is a stem 18. One extremity of the stem is positioned within the casing 16, and surrounding this extremity and secured to the stem in any suitable manner is a metal disk 19, which in turn supports about the peripheral edge thereof a rubber cup-like element 20. The rim of the cup is preferably constructed from hard rubber to possess the desired rigidity for the purpose to be hereinafter mentioned, while the body of the cup is preferably constructed from rubber possessing a higher degree of flexibility, to permit the cup to collapse in the manner to be hereinafter described. The arm 15 is provided with an extension 21 to which one extremity of a lever 22 is pivotally associated, the lever having an opening 23 for the reception of the stem 18. Fixed upon the stem is a collar 24 against which the lever is adapted to engage for imparting an inward movement to the stem when the lever is moved in a similar direction. A spring 25 is coiled about the stem, being interposed between the curved extremity of the arm 15 and the collar 24, and functionating to exert an outward pressure on the stem 18, Projecting from the arm 15 in the direction of the stem, are spaced parallel lugs 26 the latter being provided with openings registering with a similar opening in the base of the bracket, and arranged to slide through said openings is a rod 27. The rod is provided with a threaded portion to accommodate a nut 28 utilized in effecting an adjustment of the rod, and as shown the nut 28 is positioned between the lugs 26. Carried by the outer extremity of the rod 27 is a block 29, from which projects the shank 30 of a bell 31. Extending from one of the lugs 26 is a scale 32 being graduated in inches, and indicating various thicknesses of the cakes formed within the press. Projecting from the block 29 is an arrow 33 movable across the scale and coöperating with the graduations thereon for determining the proper adjustment of the rod 27 consistent with the desired thickness of the cake. Pivoted upon the block 29 is a dog 34 which is adapted to engage in a notch 35 in the stem 18 to hold the stem fixed relatively to the rod 27 in an adjusted position of the parts.

In practice, it is first determined what the thickness of the cakes shall be when they are removed from the press, and the rod 27 is subsequently adjusted through the instrumentality of the nut 28, until the arrow 33 indicates the desired thickness upon the scale 32. With the adjustment of the rod 27 the position of the dog 34 with respect to the stem 18 is varied, and subsequent to said adjustment of the rod the stem 18 is adjusted to position the notch 35 to be engaged by the dog 34. During this adjustment of the stem 18 the spring 25 is placed under tension, and exerts a pressure outwardly to maintain the dog positioned within the notch 35 whereupon the stem is held fixed relatively to the rod 27. With the adjustment of the stem 18 the rubber cup-like element 20 is moved toward and away from the adjacent filtering device, or in other words this cup-shaped element is spaced a more or less distance away from the filtering device consistent with the desired thickness of the cake to be formed thereon. During the filtering process the liquid pressure upon the opposite sides of the disk 19 is equal, but when the cake formed upon the filtering devices increases in thickness to the thickness indicated upon the scale 32, the cup engages the adjacent cake, during which time the liquid is forced from beneath the cup. The pressure of the liquid on the opposite side of the disk 19 causes the cup to collapse, moving the stem 18 inwardly, thus effecting a release of the dog 34. For this purpose, a spring 36 has one end secured to the dog and its opposite end secured to the shank 30 of the bell, and when the stem 18 is moved inwardly upon collapsing of the cup 20, the spring 36 operates to throw the dog 34 out of engagement with the notch and into contact with the bell 31 sounding the latter, and thus informing the operator of the fact that the cakes have increased in size to the desired thickness and are ready to be removed from the press. It is to be understood, that prior to the release of the dog 34, the spring 25 is sufficiently strong to overcome the tension of the spring 36, thus maintaining the dog operatively associated with the stem.

The inner end of the stem 18 is provided with a bore 37 opening at the inner end of the stem, and at one side thereof, while carried by the rod 27 is a valve 38 which closes the bore at the side of the stem. Subsequent to the collapse of the cup 30, during which time the stem is moved inwardly as above described, the bore 37 is moved away from its valve to permit the liquid to flow through the bore within the cup 20, with a view of equalizing the pressure as will be readily understood. When the pressure of the liquid on the opposite sides of the disk becomes equal, subsequent to the collapsing of the cup 20, the spring 25 operates to retract the stem 18 together with the cup 20, to locate the parts in an out of the way position while the cakes are being discharged or removed from the press. It might be added that the component parts of the invention may vary in size, and form, and may be constructed from any material suitable for the purpose intended.

What is claimed is:—

1. A device for indicating the thickness of cake formation in a filter press embodying an audible signal, and means for automatically sounding the signal at a predetermined time.

2. A device for indicating the thickness of cake formation in a filter press, embodying a rod projecting within the press for movement toward and away from the adjacent filtering element, means for holding said rod fixed in a given position, and means for automatically fixing the release of said rod at a predetermined interval.

3. A device for indicating the thickness of cake formation in a filter press comprising a yieldably mounted element adapted to be positioned different distances away from the filtering means within the press consistent with the desired thickness of the cake, a signal, means for holding said element fixed in a given position, and means for automatically effecting a release of said element at a predetermined interval whereupon said signal is rendered active.

4. A device for indicating the thickness of cake formation in a filter press comprising an adjustable locking element, a gage for determining the degree of adjustment of said element consistent with the desired thickness of the cake, a yieldably mounted member capable of movement toward and away from the filtering devices within the press, and adapted to be moved subsequent to the adjustment of said locking element to be engaged thereby and held fixed in its given position, and means automatically effecting a release of said member from said locking element at a predetermined time.

5. A device for indicating the thickness of cake formation in a filter press, comprising a gage, an adjustable locking element including an arrow coöperating with said gage for determining the degree of adjustment of said element consistent with the desired thickness of the cake, a member capable of movement toward and away from the filtering device within the press and adapted to be engaged by said locking element and maintained fixed in a given position, means for automatically effecting a release of said member from the locking element when said member comes in contact with the cake, and yieldable means for moving said member in a direction away from the cake subsequent to the release of said member.

6. A device for indicating the thickness of cake formation in a filter press comprising a gage, an adjustable rod, a pivoted locking element carried by said rod, means carried by the rod and coöperating with said gage for indicating the degree of adjustment of said rod consistent with the desired thickness of the cake, a signal, a yieldably mounted member adapted to be engaged by said locking element and held fixed in a given position a predetermined distance from the filtering device within the press, means for automatically effecting a release of said member at a predetermined time, and means for causing the locking element to sound a signal subsequent to the release of said member.

7. A device for indicating the thickness of cake formation in a filtering press comprising a bar mounted for sliding movement and having a portion operating within the press, a disk carried by one end of the bar, a flexible cup-shaped element associated with the disk, means for locking the bar in a given position to space said cup-shaped element a predetermined distance from the filtering device within the press, said cup being collapsed under the pressure of the fluid within the press, subsequent to the closing of the cup-shaped element by contact with the cake formed on said filtering device when the cake increases in size to the desired thickness, means for effecting a release of said rod from the locking means subsequent to the collapsing of said cup-shaped element, and means for automatically moving the rod away from the filtering device when released.

8. A device for indicating the thickness of cake formation in a filter press comprising a yieldably mounted bar having a portion arranged within the press, a disk carried by one end of the bar, a flexible cup-shaped element associated with the disk, a pivoted locking element for holding said bar in a given position with the cup-shaped element spaced a predetermined distance from the filtering device within the press, said cup-shaped element being collapsed by the fluid pressure within the press when the cake increases in size to the desired thickness closing the open end of said cup-shaped element, a signal, and means for moving said locking element out of engagement with said bar subsequent to the collapsing of said cup-shaped element, whereupon said yieldable means retracts said bar away from said cake, said locking element sounding said signal when disengaged from said bar.

9. A device for indicating the thickness of cake formation in a filter press comprising a yieldably mounted bar having a portion arranged within the press, a disk carried by one end of the bar, a flexible cup-shaped element associated with the disk, means for locking said bar in a given position to space the cup-shaped element a predetermined distance from the filtering device in the press, said cup being collapsed by the liquid pressure within the press upon one side of the disk when the cake increases in size to the predetermined thickness closing the open end of said cup-shaped element, said bar having a valve controlled inlet port establishing communication between the press and said cup shaped element, permitting the inflow of liquid to the cup-shaped element subsequent to the collapse of said element to equalize the pressure on the opposite sides of the disk, and said locking means liberating the bar with the collapse of said cup-shaped element, whereupon said bar is retracted away from the cake, and a signal operable upon release of said locking means.

In testimony whereof I affix my signature.

DANIEL T. NICHOLSON.